United States Patent [19]

Kusui et al.

[11] 4,162,530
[45] Jul. 24, 1979

[54] AUTOMATIC ENERGY SUPPLY SYSTEMS OF THE MULTI-RATE CALCULATING TYPE

[75] Inventors: Shoji Kusui, Tokyo; Kazuo Kitagawa, Hiroshima, both of Japan

[73] Assignee: Nihon Vending Machine Co., Ltd., Hiroshima, Japan

[21] Appl. No.: 861,164

[22] Filed: Dec. 16, 1977

[30] Foreign Application Priority Data

Dec. 21, 1976 [JP] Japan ................................. 51-152942

[51] Int. Cl.$^2$ ...................... G01R 11/57; G01R 11/24
[52] U.S. Cl. ............................... 364/464; 235/92 EL; 324/116; 340/178; 364/483
[58] Field of Search ................ 364/464, 483, 481, 493, 364/492, 569; 235/92 EL, 92 AC; 324/115, 116; 307/139–141; 194/11; 340/152 R, 178

[56] References Cited

U.S. PATENT DOCUMENTS

| | | | |
|---|---|---|---|
| 3,416,075 | 12/1968 | Rutenberg | 364/464 |
| 3,683,343 | 8/1972 | Feldman et al. | 324/116 |
| 3,778,637 | 12/1973 | Arita | 194/11 |
| 3,783,988 | 1/1974 | Kinemura | 194/11 |
| 4,050,020 | 9/1977 | Germer et al. | 364/483 |
| 4,065,663 | 12/1977 | Edwards | 364/464 |
| 4,080,568 | 3/1978 | Funk | 364/464 |
| 4,082,999 | 4/1978 | Staker | 324/116 |

*Primary Examiner*—Errol A. Krass

*Attorney, Agent, or Firm*—Blakely, Sokoloff, Taylor & Zafman

[57] ABSTRACT

According to the supply system, a customer purchases a chip corresponding to a predetermined amount of electricity from a power company and sets the chip in a control device installed in the customer house. The supply system comprises an integrating watthour meter which integrates the power consumed by the customer and generates a pulse signal for each unit of consumed power, a timer responsive to the output of the integrating watthour meter for producing a time signal corresponding to a predetermined rate calculating interval, a multi-rate calculating unit responsive to the timer signal and the pulse signal for independently calculating a plurality of operation rate elements an electric switch for supplying power to the customer, a rate detection selection unit including a rate detection member, a multi-rate calculation function unit including a plurality of elements which are set with various parameters regarding tax and rate and adapted to be combined with the multi-rate calculating unit for calculating the rate, and a rate function unit including a rate element set with an amount of power corresponding to the amount of purchased power and adapted to be combined with the rate selection detection unit for producing a rate signal corresponding to the purchased amount of power. The switch is controlled by the rate signal for supplying to the customer a predetermined amount of power.

10 Claims, 3 Drawing Figures

AUTOMATIC ENERGY SUPPLY SYSTEMS OF THE MULTI-RATE CALCULATING TYPE

BACKGROUND OF THE INVENTION

This invention relates to an automatic energy supply system of the multi-rate calculating type utilized by such public energy supply utilities as electric power, town gas and aqueduct water supply companies.

According to prior art rate collecting methods a meter inspector inspects integrating demand meters installed in the customer houses, then debit notes for respective customers are prepared by computing the result of inspection of the demand meters by means of an electronic computer. The debit notes are then sent to the customers to collect the rates through banks or service men who visit the customers.

Such method of collecting rates requires a large member of service men so that it is not suitable in sparsely populated areas. Collection of the rates through banks adds extra cost. Accordingly, it is necessary to develop a novel system of inspecting the demand meters and collecting the rates.

As an approach to this problem, an automatic energy supply systems have been developed for vending such public energy as electric power, town gas and aqueduct water. According to one system the customer buys a chip with which he can consume electric power of 100 KWH, for example, and inserts this chip into an automatic electricity supply device installed in his house for consuming electric power corresponding to the price of the chip. By periodically inserting the chips into the automatic electricity supply device continuous supply of power is ensured without interruption. With this system since it is possible to supply public energy in an amount already bought by the customer, troublesome jobs of meter inspection, preparation of debit notes and collection of the rates are eliminated. Examples of this system are disclosed in U.S. Pat. Nos. 3,783,988 and 3,778,637, for example.

With such prior art energy supply system, however, in the case of electricity, for example, as the quantity of electricity is determined by the inserted chip, such system is not applicable unless the rate of electric power is constant. The present date rate is extremely complicated and differs greatly not only for different power companies but also for different types of use. Even when the rate is determined according to the reading of a watthour meter, the rate is different for respective customers due to the difference in the base rate, multi-stage increasing or decreasing rate, a tax exemption limit, etc. For this reason, the rate may be different even for the same amount of electricity. Accordingly, when a conventional watthour meter is used for the present rate system, records of the amount of the used electric power in unit calculation interval, usually one month, are kept, and these records are collected at the time of the periodical inspection (once in year). Thereafter, the total amount of the power used, base rate, multi-stage rate and the tax exemption limit, etc., are calculated. However, as such calculation involves complicated calculation, the advantage of decreasing the number of meter inspections decreases greatly. For this reason, such system is practical only in extremely sparsely populated or extremely densely populated areas where the business of meter reading and rate collection is too expensive. Accordingly, the application of the chip system is limited, especially in the present day multi-rate system.

SUMMARY OF THE INVENTION

Accordingly, it is an object of this invention to provide a novel automatic energy supply system of the multi-rate calculating type according to which an accurate calculation of the rate can be made under a multi-rate system and the business of meter reading and rate collection can be completely eliminated.

According to his invention there is provided an automatic energy supply system of the multi-rate calculating type comprising pulse generating integrating means which integrates the amount of used energy and generates an electric signal whenever a predetermined unit amount of the energy has been used by a customer, a pulse converter for converting the electrical signal into a pulse signal, a timer responsive to the electric signal for generating a time signal corresponding to a rate calculating interval, a multi-rate calculating unit responsive to the time signal and the pulse signal for independently calculating a plurality of operation rate units, a switch means for supplying the energy to the customer, a rate detection selection unit including a rate detection member, a multi-rate calculation unit including a plurality of elements which are set with various parameters regarding tax and adapted to be set in the multi-rate calculating unit for calculating the rate, a rate function unit including a rate element set with an amount of money corresponding to a predetermined amount of purchased energy and adapted to be set in the rate selection detection unit for producing a rate signal corresponding to the amount of money, and means responsive to the rate signal for controlling the switch means for supplying to the customer the predetermined amount of energy.

DESCRIPTION OF THE PREFERRED EMBODIMENT

Figure 1:
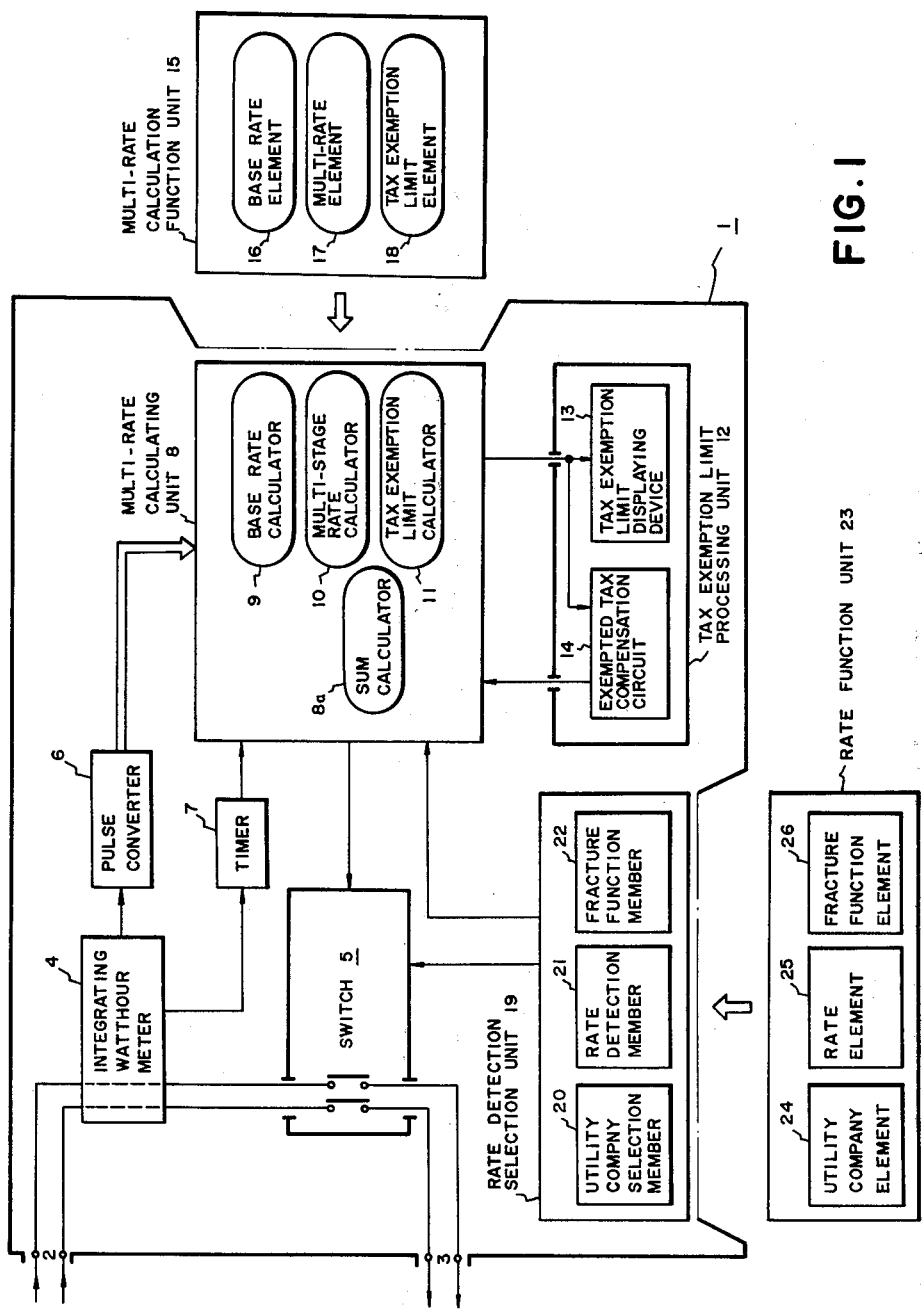
FIG. 1 is a block diagram showing the basic construction of the automatic energy supply system of the multi-rate calculation type embodying the invention and FIGS. 2A and 2B, when combined, show a detailed block diagram of the system shown in FIG. 1.

Apparatus 1 installed in each customer's house is provided with supply terminals 2 and load terminals 3. The electric power supplied to source terminals 2 flows to a switch 5 via a well known pulse generating type integrating watthour meter. When switch 5 is closed, the power is supplied to a load circuit through load terminals 3. The integrating watthour meter integrates the amount of power used and transmits a pulse representing a unit power, for example 1 KWH to a pulse converter 6. In response to the pulse, the pulse converter 6 generates various operating signals utilized to operate various circuits to be described hereunder. The other signal generated by the integrating watthour meter 4 is sent to a timer 7 which produces a time signal corresponding to a unit interval for calculating the rate, usually one month, and the time signal is applied to a multi-rate calculating unit 8 comprising a base rate calculator 9, a multi-stage rate calculator 10, and a tax exemption limit calculator 11, each constituted by an electronic circuit. The base rate calculator 9 is supplied with the time signal from timer 7 for calculating an amount corresponding to the base rate per month, whereas the multi-stage rate calculator 10 is supplied with an operating signal from the pulse converter 6 and the time signal from the timer 7 for calculating the amount of power corresponding to the price of a predetermined rate which is different depending upon the amount of the power used in each month. Similarly the tax exemption limit calculator 11 is supplied with the operating signal from the pulse converter 6 and the time signal from the timer 7 to determine whether the amount of power used in a month has exceeded the tax exemption limit or not. The results of these calculations and the rate signal to be described later are calculated by a sum calculator 8a to produce a sum signal which is applied to the switch 5. The tax exemption limit calculator 11 applies a tax exemption limit signal to a tax exemption limit displayer 13 and a tax compensation circuit 14 of a tax exemption limit processing unit 12. The tax exemption limit displaying device 13 displays and records the total amount of power in a year after discounting a predetermined amount of tax, or the number of months in a year in which tax is not imposed. This record is used to return the exempted tax because the amount of purchased power includes power consumption tax. The exempted tax compensation circuit 14 generates a tax exemption limit calculating signal, that is a signal corresponding to an electric power in KWH which corresponds to the power which has been exempted the tax where the amount of power used is below the tax exemption limit, and this signal is fed back to the sum calculator 8a of the multi-rate calculating unit 8 for compensating for the exempted KWH.

A multi-rate calculation function unit 15 is constituted by a base rate element 16, a multi-rate element 17, and a tax exemption limit element 18, each constructed by an electronic logic circuit in which a prescribed data on parameters corresponding to the content of the agreement of each customer is set. When the multi-rate calculation function unit 15 is inserted into the multi-rate calculating unit 8 of the device 1 like a cassette in a direction indicated by an arrow, the base rate calculator 9 and the base rate element 16; the multi-rate calculator 10 and the multi-rate element 17; and the tax exemption limit calculator 11 and the tax exemption limit unit 18 are connected in cascade respectively. Thus, the multi-rate calculation function unit 15 is exchanged only when an agreement for supplying electric power to a customer is made, when the content of the agreement is changed, when the rate system is renewed and when the device is exchanged. For this reason, it is not necessary to exchange the multi-rate calculation function unit 15 during normal use.

A rate detection selection unit 19 comprises a utility company selection member 20, a rate detection member 21 and a fracture function member 22, and a rate function unit 23 comprising a utility company element 24, a rate element 25, and a fracture function element 26 is inserted into the rate detection selection unit 19 like a cassette in the direction of an arrow. The purpose of inserting the rate function unit 23 is to determined whether the power has been sold by a contracted utility company or not, in other words, whether the power is suitable for a specific customer or not. The rate function unit 23 may be either electrical or mechanical means. The utility company selection member 20 cooperates with the utility company element 24 so that when the power supply company is correct it generates a certification signal. In response to this signal, the rate detection selection unit 19 generates a signal for closing the switch 5. The rate detection member 21 cooperates with the rate element 25 so that when the amount of money for purchasing the power set therein is correct it sends a rate signal corresponding to the amount of money to the multi-rate calculating unit 8 where the signal and the value of the other various elements are operated so as to send a sum signal to the switch 5 for opening the same.

The fracture function member 22 cooperates with the fracture function element 26 and it thermally or magnetically fractures the fracture function element 26 after confirming that the inserted element is correct, thereby disenabling the improper reuse of the rate function unit 23. The detail of the fracture function member 22 is disclosed in U.S. Pat. Nos. 3,778,637 and 3,760,924. Fracture of the fracture function member 22 is effected by using so-called rate pre-pay system in which the member 22 is immediately fractured after insertion of the rate function unit 23 into the rate detection selection unit and when the element is a correct one, or so-called post-pay system in which the element is fractured before complete consumption of the purchased electric power.

The rate function unit 23 is purchased by a customer by paying an amount of money corresponding to the amount of power to be consumed by the customer, and when it is inserted into the rate detection selection unit 19, the amount of money is operated together with the values of various other elements to convert them into a power supply time that the customer can enjoy by the amount of money. Thus the switch 5 is maintained in the closed state for an interval in which the purchased amount of power can be supplied. When supply of the power corresponding to the rate equal to the amount of money spent by the customer to purchase the rate function unit 23 is completed the switch 5 is automatically opened. Generally, however, although not shown in the drawing an alarm signal is generated before complete consumption of the purchased power and insert a new rate function unit. Accordingly, if the customer renews the rate function unit, power is continuously supplied as is disclosed in U.S. Pat. No. 3,778,637.

Figure 2A:
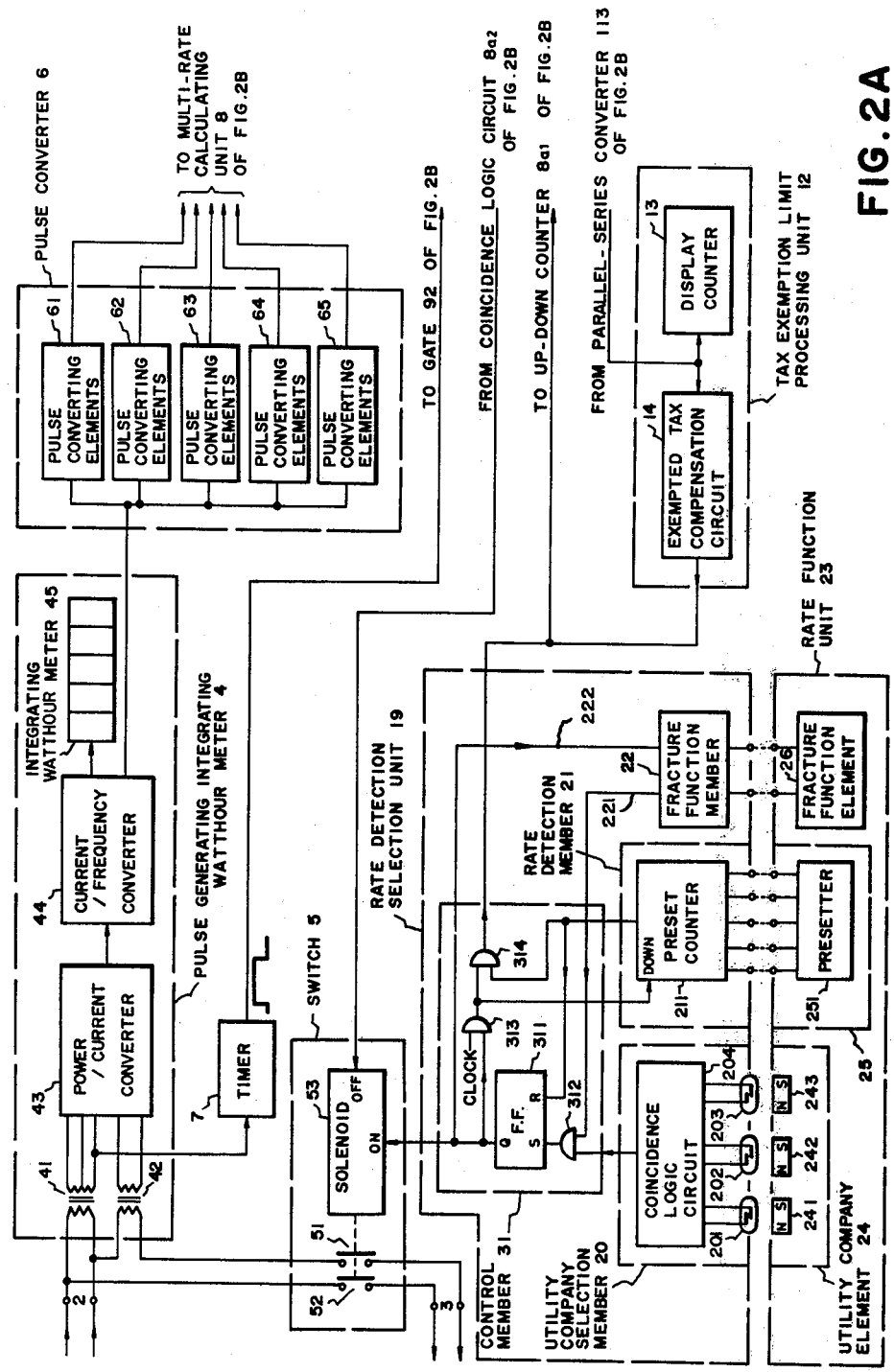
Figure 2B:
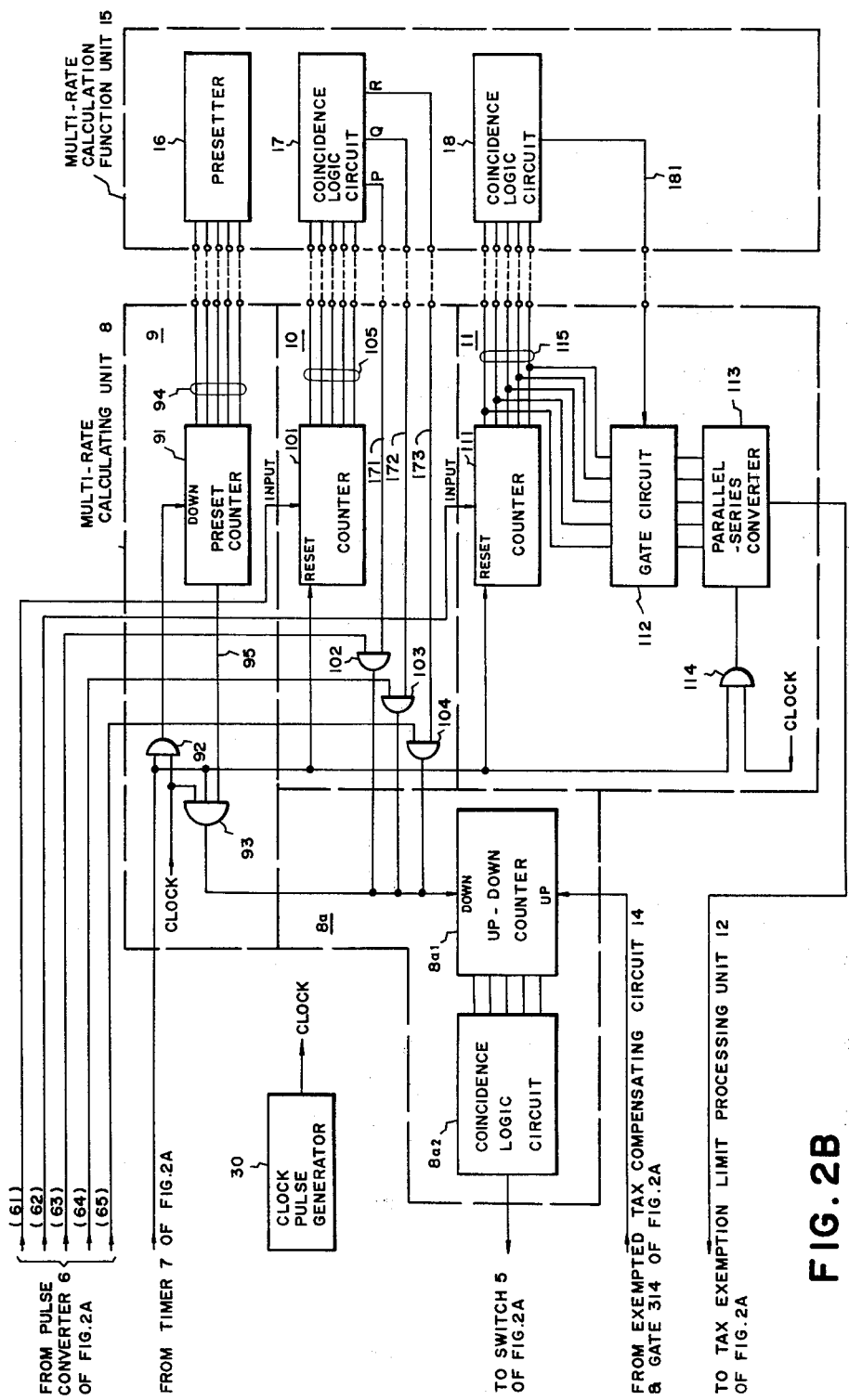

FIGS. 2A and 2B show a detailed construction of the embodiment shown in FIG. 1, and corresponding elements are designated by the same reference charactors. More particularly, the pulse transmitting integrating watthour meter 4 is supplied with voltage and current signals from supply terminals 2 through a potential transformer 41 and a current transformer 42 for producing one pulse signal per one KWH, for example, by a power (W)/current (I) converter 43 and a current (I)/frequency converter 44. Usually, this pulse signal is applied to an integrating watthour meter 45. The output pulse signal of the I/F converter 44 is also supplied to a succeeding pulse converter 6.

The pulse converter 6 comprises first to fifth pulse converting elements 61 through 65 for forming operating signals utilized to operate multi-stage rate calculator 10 and the tax exemption limit calculator 11 of the multi-rate calculating unit 8. The first and second pulse converting elements 61 and 62 supply pulses corresponding to the amount of power consumption to the multi-stage rate calculator 10 and the tax exemption limit calculator 11 respectively. The pulse converting element 61 may be constructed such that it passes the pulse from the watthour meter 4 without any change. The third to fifth pulse converting elements 63, 64 and 65 produce three types of outputs having different pulse spacings and adapted to determine a rate system in which the rates vary in three stages in accordance with the amount of power consumption.

The timer 7 comprises a frequency division circuit and a flip-flop circuit or a monostable multi-vibrator, not shown, energized by the secondary winding of input transformer of the pulse generating integrating watthour meter 4 thereby producing a pulse having a definite width with a definite interval, for example one month.

The base rate calculator 9 of the multi-rate calculating unit 8 comprises a preset counter 91, an AND gate circuit 92 and a AND gate circuit 93. The preset counter 91 is connected to a plug-in type presetter 16 comprising the base rate element of the multi-rate calculation function unit 15 via lead wires 94 and a plug switch, not shown whereby a predetermined preset value is applied to the preset counter 91 from the presetter 16, which may have a well known manual preset construction. The preset counter 91 counts down its preset value in response to the output of the AND gate circuit 92. When its preset value becomes to zero it produces an output on an input/output line 95. When the AND gate circuit 92 is supplied with an input pulse at an interval of one month from timer 7 it produces the clock pulse supplied to the other input on its output and this clock pulse is applied to the down count input of the preset counter 91. The clock pulse is supplied from a clock pulse generator 30.

The AND gate circuit 93 is connected to receive the clock pulse, the output of the timer 7 and the inverted output of the preset counter 91 at its inputs. Consequently, when the AND gate circuit 93 receives a pulse from the timer 7 at an interval of one month it produces the clock pulse on its output. At this time, since the contents of the preset counter 91 is not yet reduced to zero no output is produced an line 95, whereby the input condition to the AND gate circuit is not effected. At the same time when the AND gate circuit 93 produces the clock pulse on its output, the AND gate circuit 92 is also enabled to send the clock pulse to the preset counter 91 thus causing it to count down. When the content of the counter 91 is reduced to zero the AND gate circuit 93 would be disenabled irrespective of the other inputs thus terminating the sending out of the clock pulse. The output of the AND gate circuit is sent to a up-down counter of the sum calculator as will be described hereinafter.

The multi-stage rate calculator 10 of the multi-rate calculating unit 8 comprises one counter 101 and three AND gate circuits 102, 103 and 104. The counter 101 is provided with a predetermined number of stages and performs a counting operation in response to the output of the first pulse converting element 61 of the pulse converter 6. The outputs of the counter 101 are derived out in parallel and sent to a coincidence logic circuit comprising the multi-rate function element 17 of the multi-rate calculation function unit 15. The purpose of the coincidence logic circuit is to determine that the output of the counter 101 belongs to which one of the ranges of the multi-stage rate system, and the coincidence circuit is constituted by a diode matrix circuit, for example. For example, when the outputs of the counter 101 is from O to P, an output is produced on terminal P connected to line 171 whereas when the outputs of the counter are from P to Q, an output is produced on terminal Q connected to line 172. On the otherhand, when the outputs are larger than Q, the coincidence logic circuit produces an output on terminal R connected to line 173. These lines 171–173 are connected to one of the inputs of AND gate circuits 102, 103 and 104 which comprise the multi-stage rate calculator 10 of the multi-rate calculating unit 8. The other inputs of these AND gate circuits are connected to receive the output signals from the third to fifth converting elements 63—63 of the pulse converter 6, that is the multi-stage rate pulse signals, respectively. These pulse signals are generated at different intervals corresponding to the rate systems of respective stages. The outputs of the AND gate circuits 102, 103 and 104 are commonly applied to the input of an up-down counter of the sum calculator to be described later. The counter 101 is reset by a signal sent from the timer 7 at an interval of one month.

The tax exemption limit calculator 11 of the multi-rate calculating unit 8 comprises one counter 111, a gate circuit 112, a parallel-series converter 113 and an AND gate circuit 114. The counter 111 is provided with a predetermined number of stages or digits and performs its counting operation in response to the output of the second pulse converting element 62 of the pulse converter 6. The outputs of this counter are derived out in parallel and are coupled to a second coincidence circuit comprising the tax exemption limit element 18 of the multi-rate calculation function unit 15 via lead wires 115 and a plug-in switch not shown. The purpose of the coincidence logic circuit is to determine that whether the outputs belongs to a predetermined tax exemption limit system or not, and constituted by a diode matrix circuit, for example. If the condition of tax exemption is satisfied an output is produced on line 181 which is sent to the gate circuit 112 via a plug-in switch, not shown. The gate circuit 112 controls whether the parallel outputs of the counter 111 are to be sent to the parallel-series converter 113 or not. So long as the output of the counter 111 does not reach a predetermined value, the coincidence logic circuit 18 applies an output to line 181 to close the gate circuit 112 thus supplying the outputs of the counter 111 to the parallel-series converter. When the output of the counter 111 exceeds the tax exemption limit, the coincidence logic circuit 18 does not produce an output. Thereafter the gate circuit 112 is opened.

When supplied with the output of the AND gate circuit 114, the parallel-series converter 113 converts the parallel outputs of the counter 111 supplied thereto through the gate circuit 112 into a series output which is sent to a display counter 13 to display the integrated value of the rate of the power which has been exempted the tax. The output of the parallel-series converter 113 is sent to the exempted tax compensation circuit 14 which calculates the amount of power to be fed back to the sum calculator 8a from the supply input.

The sum calculator 8a of the multi-rate calculating unit 8 will now be described. The sum calculator 8a comprises a up-down counter 8a1 and a coincidence logic circuit 8a2 which is connected to receive the parallel outputs of the up-down counter 8a1. To the down count input of the coincidence logic circuit 8a2 are applied the output of AND gate circuit 93 of the base rate calculator 9 and the outputs of AND gate circuits 102, 103 and 104 of the multi-stage rate calculator, whereas the up-count input of this counter 8a1 is connected to receive the output of the exempted tax compensation circuit 14 and the output of a preset counter comprising the rate detection member 21 of a rate detection selection unit 19 to be described later.

The rate detection selection unit 19 comprises a utility company selection member 20, the rate detection member 21, the fracture function member 22 and a control member 31.

The utility company selection member 20 comprises a plurality (in this example 3) of reed switches 201, 202 and 203, and a coincidence logic circuit connected across respective reed switches for producing a coincidence output when these reed switches are closed at the same time, for example. The utility company element 24 of the rate function unit 23 which is combined with the utility company element 24 is constituted by a plurality of permanent magnets 241-243 which are arranged to close opposing reed switches when they are correctly inserted into the device.

The rate detection member 21 comprises a preset counter 211 alone which is preset to a value set in the presetter 251 of the rate element 25 when the rate function unit 23 is correctly set or inserted into the device. The presetter is set with the purchased price of the rate function unit 23 or a value corresponding to the amount of purchased power, and it is sealed so that the purchaser can not manually manipulate it. The presetter 251 is constituted by a diode matrix circuit, for example in which diodes are selectively connected to the crosspoints of the matrix circuit according to the set value. The preset counter 211 operates to count down the preset value in accordance with the output of the control unit 31 which is applied to its down count input, and produces an output when its count is decreased to zero.

Like a well known fracture function member described above, the fracture function member 22 provides an output signal to the control member 31 over line 221 when it is connected to a sound or not yet fractured fracture function element 26. When a fracture signal is applied to line 222 from the control member 31, large current is passed through the fracture function element 26 through the fracture function member 22 to blow a fuse, not shown or to sublimate a sublimation magnet thus terminating signal produced on line 221. Examples of the fracture function elements are disclosed in U.S. Pat. Nos. 3,778,637 and 3,760,924.

The control member 31 of the rate detection selection unit 19 is constituted by a flip-flop circuit 311, AND gate circuits 312 and 313 and a AND gate circuit 314. The AND gate circuit 312 is connected to receive the certification output of the coincidence logic circuit 204 of the utility company selection member 20, and a signal sent through line 221 of the fracture function member 22, that is a signal that shows that the fracture function element 26 is normal. Thus, the output signal of the AND gate circuit 312 shows that the rate function unit set in the device is a correct or genuine one, and this output is applied to the set terminal S of the flip-flop circuit 311 to cause it to produce Q output which is applied to switch 5 and one input of the AND gate circuit 313. The Q output of the flip-flop circuit is also sent to the fracture function member 22 over line 222. Consequently, the fracture function member 22 fractures the fracture function element 26 in response to this Q output signal thus disenabling further use.

To the other input of the AND gate circuit 313 is applied to clock pulse from the clock pulse generator 30. Consequently, when supplied with the Q output of the flip-flop circuit 311, the AND gate circuit 313 supplies the clock pulse to the down count input of the preset counter 211 to count down its content. Furthermore, the output of AND gate circuit 313 is applied to one input of the AND gate circuit 314 having the other input connected to receive an inverted output of the preset counter 211 which is produced when its count is reduced to zero. Consequently, when the AND gate circuit 314 receives the clock pulse from the AND gate circuit 313, the clock pulse is applied to the up-down counter 8a1 of the sum calculator 8a together with the output of the exempted tax compensating circuit 14. However, when the output of the preset counter 211 is applied the AND gate circuit 314 is disenabled.

The switch 5 comprises contacts 51 and 52 connected between the power input terminals 2 and the load terminals 3 and a solenoid for operating these contents. When supplied with the output of the control member 31 of the rate detection selection unit 19 and the Q output of the flip-flop circuit 311, the solenoid 53 closes the contacts 51 and 52, whereas the solenoid opens these contacts in response to the output of the coincidence logic circuit 8a2 of the sum calculator 8a.

It should be understood that the invention is not limited to the specific embodiment described above and that many changes and modifications are obvious to one skilled in the art. For example, the counter 111 of the tax exemption limit calculator 11 may be combined with the counter 101 of the multi-stage rate calculator 10.

Although the utility company selection member 20 of the rate detection selection unit 19 and the utility company element 24 were coupled together by means of reed switches and permanent magnets it is possible to change guide groove on the outer wall of the rate function unit 23 or the shape of this unit may be changed for each utility company. In this case, the signal provided on line of the fracture function member 22 is applied directly to the flip-flop circuit 311 of the control member 31.

Furthermore, although the rate detection member 21 was constituted by the preset counter 211, it can be constituted by other means. More particularly, as above described, the rate function unit 23 to be combined with the rate detection selection unit 19 is purchased by a customer at a price corresponding to the electric power that can be consumed. Accordingly, any other suitable means can be used so long as it can send an electric signal corresponding to used power to the multi-rate calculating unit 8. In this case too, reed switches are combined with permanent magnets for producing an electric signal corresponding to consumed power.

In the case of a rate collection system, the output of the coincidence logic circuit 8a2 of the sum calculator 8a is applied to line 222 leading to the fracture function member 22 instead of the output of the control member 8a.

Although the multi-rate calculating unit 8 was shown as comprising three elements, that is a base rate element 16, a multi-rate element 17 and a tax exemption limit element 18, these elements are typical elements so that it is possible to eliminate any one of them or to add other elements depending upon the content of the agreement between a given customer and a utility company.

At present, since the rate is calculated at an interval of one month, respective calculators of the multi-rate calculating unit 8 are constructed to produce signals at an interval of one month but for different interval of calculating the rate the setting of the timer is changed.

Above described embodiment was described in terms of an automatic electric power supply system but it should be understood that the invention is equally applicable to the supply of town gas, aqueduct water or the like in which case, the calculating operation of the multi-rate calculating unit 8 and the pulse generating integrating meter are of course to be changed accordingly.

Thus, the invention provides a novel automatic energy supply system of the multi-rate calculating type wherein a multiple-calculating function element including a base rate element which is set with a predetermined data, a multi-rate element, and a tax exemption limit element is set in a multi-rate calculating unit to calculate these elements, a rate function unit including a rate element which is set with a purchased price is set in a rate detection and selection unit for calculating a rate signal corresponding to the purchased price so as to automatically supply an amount of energy corresponding to the purchased price. The energy supply system of the invention can supply accurate amount of energy in accordance with the content of the agreement between a utility company and a customer for complicated rate systems without any change of the system, whereby the business of inspecting meters, and collecting money can be greatly rationalized.

Throughout the specification term "energy" is used to mean electricity, town gas, aqueduct water or other medium which can be supplied with the supply system of this invention.

What is claimed is:

1. An automatic energy supply system of the multi-rate calculating type for controlling an amount of energy supplied to a customer comprising:
    a pulse generating integrating means coupled to an energy source for integrating said amount of energy supplied to a customer and for generating an electric signal whenever a predetermined unit of said energy is supplied;
    a pulse converter means for converting said electric signal into at least one pulse signal;
    a timer means for generating a time signal corresponding to a predetermined rate calculating interval;
    a switching means coupled to said energy source for switching said energy supplied to the customer on and off;
    a multi-rate calculation function unit comprising a plurality of element means for providing energy rate parameters and tax parameters;
    a rate function unit comprising a rate element means for providing money parameters which represent an amount of money corresponding to a predetermined amount of purchased energy;
    a rate detection selection unit comprising a rate detection member means responsive to said money parameter provided by said rate element means, said rate detection member means being a means for producing a rate signal corresponding to said predetermined amount of purchased energy; and
    a multi-rate calculating unit means coupled to said switching means and responsive to said time signal, to said at least one pulse signal, to said rate signal and to said energy rate and said tax rate parameters provided by said multi-rate calculation function unit, said multi-rate calculating unit means being a means for providing a sum signal to said switching means which causes said switching means to switch off when said amount of energy supplied to the customer corresponds to said predetermined amount of purchased energy and to said parameters regarding energy rates and tax.

2. The automatic energy supply system according to claim 1 wherein said plurality of element means of said multi-rate calculation function unit comprises:
    a base rate element means for providing base rate parameters which correspond to an energy base rate;
    a multi-rate element means for providing a plurality of energy multi-rate parameters which correspond to a plurality of energy multi-rates which are to be applied depending upon the amount of energy consumption in said predetermined rate calculating interval;
    a tax exemption limit element means for providing tax exemption limit parameters corresponding to a tax exemption limit; and
    wherein said multi-rate calculating unit comprises:
    a base rate calculator means responsive to said time signal and to said base-rate parameter, said base rate calculator means being a means for generating a base rate signal which corresponds to an amount of energy supplied to the customer at said energy base rate;
    a multi-stage rate calculator means responsive to said time signal, to said at least one pulse signal and to said energy multi-rate parameters, said multi-stage rate calculator means being a means for generating a plurality of multi-rate signals which correspond to said amount of energy supplied to the customer at each of said energy multi-rates;
    a tax exemption limit calculator means responsive to said time signal, to said at least one pulse signal and to said tax exemption limit parameters, said tax exemption limit calculator means being a means for generating a tax limit signal which indicates whether said energy consumed by the customer has exceeded a predetermined tax exemption limit in said predetermined rate calculating interval; and
    a sum calculator means responsive to said base rate signal, to said multi-rate signals, to said tax limit signal and to said rate signal, said sum calculating means being a means for supplying said sum signal to said switching means which switches said switching means off.

3. The automatic energy supply system according to claim 2 which further comprises a tax exemption limit processing unit, comprising:
    an exempted tax compensation circuit means responsive to said tax limit signal, said exempted tax compensation circuit means being a means for providing said sum calculator means an exempted energy signal which represents an amount of tax exempted energy; and
    a tax exemption limit display responsive to said tax limit signal.

4. The automatic energy supply system of claim 2 further comprising a first coupling means on said multi-rate calculation function unit and on said multi-rate calculating unit, said first coupling means being a means for manually operatively coupling said multi-rate calculation function unit to said multi-rate calculating unit and manually decoupling said multi-rate calculation function unit from said multi-rate calculating unit.

5. An automatic energy supply system according to claim 2 wherein said base rate element means is a plug-in type presetter and wherein said base rate calculator means comprises:
- a preset counter which is responsive to said plug-in type presetter;
- a clock means for generating a clock signal;
- a first gating circuit means responsive to said clock signal and to said time signal for generating an output which counts down said preset counter; and
- a second gating circuit means for generating said base rate signal in response to an output of said preset counter, to said clock signal and to said time signal.

6. An automatic energy supply system according to claim 5 which further comprises a tax exemption processing unit comprising:
- an exempted tax compensation circuit means responsive to said tax limit signal, said exempted tax compensation circuit means being a means for generating an exempted energy signal which represents an amount of tax exempted energy; and
- wherein said sum calculator means comprises:
- an up-down counter having a count-down input responsive to said output of said first gating circuit means and to said plurality of multi-rate signals generated by said multi-stage rate calculator means and a count-up input responsive to said exempted energy signal and to said rate signal.

7. The automatic energy supply system of claim 1 further comprises:
- a second coupling means on said rate function unit and on said rate detection selection unit, said second coupling means being a means for manually operatively coupling said rate function unit to said rate detection selection unit and manually decoupling said rate function unit from said rate detection selection unit;
- a utility company selection means for verifying that said rate function unit is a rate function unit of a predetermined utility company; and
- wherein said rate function unit further comprises:
- a fracture function element means for responding to a fracture signal by switching from an enable state to a disable state; and
- wherein said rate detection selection unit further comprises:
- a fracture function member means for generating said fracture signal at a time subsequent to when said rate function unit is manually coupled to said rate detection selection unit; and
- a control member means responsive to said utility company selection means, said control member means being a means for switching said switching means on provided said fracture element is in an enable state at a time when said rate function unit is manually coupled to said rate detection selection unit and provided said rate function unit is a rate function unit of a predetermined utility company.

8. The automatic energy supply system of claim 1 further comprising a second coupling means on said rate function unit and on said rate detection selection unit, said second coupling means being a means for manually operatively coupling said rate function unit to said rate detection selection unit and manually decoupling said rate function unit from said rate detection selection unit and wherein said rate function unit further comprises:
- a utility company element means for providing a company parameter which corresponds to a predetermined utility company; and
- a fracture function element means for responding to a fracture signal by switching from an enable to a disable state; and
- wherein said rate detection selection unit further comprises:
- a fracture function member means for generating said fracture signal at a time subsequent to when said rate function unit is manually coupled to said rate detection selection unit;
- a utility company selection member means responsive to said utility company selection member means, said utility company selection member means being a means for generating a certification signal when said company parameter corresponds to a predetermined utility company which supplies the energy to the customer; and
- a control member means for switching said switch means on provided said certification signal is generated and provided said fracture element is in an enable state at a time when said rate function unit is manually coupled to said rate detection selection unit.

9. An automatic energy supply system according to claim 8 wherein said utility company element means comprises:
- a plurality of magnets; and
- wherein said utility company selection member comprises:
- a plurality of serially connected switch elements responsive to said magnets; and
- a coincidence logic circuit means coupled to said switch elements for generating said certification signal provided said plurality of magnets cause said switch element means to switch when said rate function unit is manually coupled to said rate detection selection unit.

10. An automatic energy supply system according to claim 1 wherein said pulse generating integrating means comprises:
- a power current converter which converts electric power supplied to the customer into a current signal;
- a current frequency converter which converts said current signal into said electric signal; and
- an integrating watt-hour meter for integrating said electric signal.

* * * * *